United States Patent
Dean et al.

(10) Patent No.: US 8,122,256 B2
(45) Date of Patent: *Feb. 21, 2012

(54) SECURE BYTECODE INSTRUMENTATION FACILITY

(75) Inventors: Jeffrey R. Dean, Austin, TX (US); Alberto Giammaria, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/693,839

(22) Filed: Jan. 26, 2010

(65) Prior Publication Data

US 2010/0122090 A1    May 13, 2010

Related U.S. Application Data (63) Continuation of application No. 11/333,452, filed on Jan. 17, 2006, now Pat. No. 7,788,730.

(51) Int. Cl.
*H04L 29/06* (2006.01)

(52) U.S. Cl. ........ 713/176; 713/156; 713/168; 713/187; 713/193; 726/22; 726/26

(58) Field of Classification Search .................. None
See application file for complete search history.

(56) References Cited

U.S. PATENT DOCUMENTS

| | | | |
|---|---|---|---|
| 6,338,149 B1 * | 1/2002 | Ciccone et al. | 714/38.12 |
| 6,473,800 B1 * | 10/2002 | Jerger et al. | 709/226 |
| 6,950,932 B1 * | 9/2005 | Lavian et al. | 713/151 |
| 6,976,163 B1 * | 12/2005 | Hind et al. | 713/156 |
| 7,788,730 B2 | 8/2010 | Dean et al. | |
| 2005/0076205 A1 | 4/2005 | Thornton et al. | |
| 2005/0278534 A1 * | 12/2005 | Nadalin et al. | 713/175 |
| 2006/0100010 A1 * | 5/2006 | Gatto et al. | 463/29 |
| 2006/0230451 A1 * | 10/2006 | Kramer et al. | 726/22 |

OTHER PUBLICATIONS

Cholakov et al., "The Evolution of the Java Security Model", International Conference on Computer Systems and Technologies, CompSys Tech 2005[online], [retrieved on Mar. 11, 2009]. Retrieved from the Internet. Google Scholar. 6 pages.
Google Scholar Search Page[online], [retrieved on Mar. 11, 2009]. Retrieved from the Internet. Google Scholar. 2 pages.
USPTO Office Action regarding U.S. Appl. No. 11/333,452, dated Nov. 6, 2009, 11 pages.
USPTO Response to Office Action regarding U.S. Appl. No. 11/333,452, dated Dec. 18, 2009, 14 pages.
USPTO Notice of Allowance regarding U.S. Appl. No. 11/333,452, dated Apr. 19, 2010, 4 pages.

* cited by examiner

*Primary Examiner* — Minh Dinh
*Assistant Examiner* — Venkat Perungavoor
(74) *Attorney, Agent, or Firm* — Yee & Associates, P.C.; Jeffrey S. LaBaw (57) ABSTRACT

A secure bytecode instrumentation facility, wherein a new code fragment is registered in an encrypted registry by first extracting a digital certificate from a specified code fragment location. A certification authority (CA) in the digital certificate is compared against a list of registered trusted certification authorities in the registry. If the CA is in the registry list, the code fragment origin in the digital certificate is compared against a list of registered trusted origins in the registry. If the code fragment origin is in the registry list, a determination is made as to whether the code fragment is authentic. If so, the information of the code fragment is recorded into the registry. The injection of code fragments may begin upon the initialization of the instrumentation facility if the encrypted registry has not been corrupted since last accessed, and if the code fragment content matches code fragment information in the registry.

18 Claims, 8 Drawing Sheets

```
// Add the specified code fragment to the list of registered code fragments
AddCF -u<user name> -p<password> <code fragment location> <additional parameters>
       /         /          /              \                      \
      606       602        604            608                    610

//Remove the specified code fragment from the list of registered code fragments
RemoveCF -u<user name> -p<password> <code fragment id>
          /                          \
         612                         614

//Link the specified code fragment to the specified application code locations
LinkCF -u<user name> -p<password> <code fragment id> <application code locations>
        /                          \                  \
       620                         622                624

// Unlink the specified code fragment from the specified application code locations
UnlinkCF -u<user name> -p<password> <code fragment id> <application code locations>
          /                          \                  \
         630                         632                634

// Add the specified code fragment origin to the list of trusted code fragment origins
AddTrustedOrigin -u<user name> -p<password> <code fragment origin>
                  /                          \
                 640                         642

// Remove the specified code fragment origin from the list of trusted code fragment origins
RemoveTrustedOrigin -u<user name> -p<password> <code fragment origin>
                     /                          \
                    650                         652

// Add the specified CA to the list of trusted CAs
AddTrustedCA -u<user name> -p<password> <CA name>
              /                          \
             660                         662

// Remove the specified CA from the list of trusted CAs
RemoveTrustedCA -u<user name> -p<password> <CA name>
                 /                          \
                670                         672
```

SECURE BYTECODE INSTRUMENTATION FACILITY

This application is a continuation of application Ser. No. 11/333,452, filed Jan. 17, 2006, status pending.

BACKGROUND OF THE INVENTION

1. Field of the Invention

The present invention relates generally to an improved data processing system, and more particular, to a computer implemented method, data processing system, and computer program product for a secure bytecode instrumentation facility.

2. Description of the Related Art

Bytecode instrumentation is becoming a common way to extend the functionality of Java™ and Microsoft™ .Net applications when, for any reason, access to the application source code is not available. With bytecode instrumentation, it is possible to add functionality like tracing, logging, performance, license usage stubs, etc., even when the application has already been deployed in the customer environment.

Bytecode instrumentation facilities can be placed in two categories: facilities that modify the application binaries, and facilities that modify the application code segments leaving the file system binaries intact. With regard to security issues of facilities in the second category, different tools exist today that automatically instrument Java™ applications by injecting code fragments into the application classes while the classes are loaded into memory by the Java™ Virtual Machine (JVM™) Bytecode Engineering Library™ (BCEL), Java™ Runtime Analysis Toolkit (JRat), JBoss™, Aspect Oriented Programming™ (AOP), etc. (from the open source community), Just-in-Time Instrumentation (JITI), .Net Instrumentation (NETI) (from International Business Machines Corporation), as well as others from companies that sell system management software for managing Java™ and .Net applications. When used with good intentions, this bytecode instrumentation technology is very helpful to provide immediate fixes to customers, to extend applications with the necessary code so that a managing tool can manage them, and to allow a support team to perform application customizations for special customer needs that cannot be satisfied by the company supplying the application.

Unfortunately, when in wrong hands, this technology enables hackers to insert malicious code to steal confidential data or crash applications while a customer has very little awareness of what is going on. The customer may not be aware of the problem since typical investigation methods, such as checking that all application binaries are intact or running an antivirus tool, would not reveal any problem as the malicious modifications are done in memory, not in the file system. Thus, the strength of this bytecode technology—its ability of modifying applications by only touching the code segments—is also his Achilles' heel. Without powerful security measures, its advantages are obliterated by the danger that malicious users can take control of the bytecode instrumentation.

Existing bytecode instrumentation facilities do not provide strong security measures to prevent hackers from exploiting the facilities. The only security measure provided requires the instrumentation facility to be installed in such a way that only an administrator can access the code fragments (usually Java™ class files and Jar files) that are injected into the target application, and the registry (usually a file or a database) that specifies which code fragments go in which locations of the application. However, a problem with this simple security mechanism is that if a hacker finds access to the administrator password of a system, the hacker can replace code fragments or inject new code fragments modifying customer applications in a way that it is very difficult for the customer to detect.

SUMMARY OF THE INVENTION

Embodiments of the present invention provide a computer implemented method, data processing system, and computer program product for a secure bytecode instrumentation facility. A new code fragment is registered in an encrypted registry of the bytecode instrumentation facility by first extracting a digital certificate from a specified code fragment location in the registration command. The certification authority (CA) in the digital certificate is compared against a list of registered trusted certification authorities in the encrypted registry. If the CA in the digital certificate is in the registry list, the code fragment origin in the digital certificate is compared against a list of registered trusted origins in the encrypted registry. If the code fragment origin is in the registry list, a determination is made as to whether the code fragment is authentic. If so, the information of the code fragment is recorded into the encrypted registry.

When the bytecode instrumentation facility is initialized, a determination is made as to whether the encrypted registry has been corrupted since the last time the encrypted registry was accessed. If the encrypted registry has not been corrupted, a determination is made as to whether the content of the code fragment matches information of the code fragment in the encrypted registry. If the content of the code fragment matches the information of the code fragment in the encrypted registry, the initialization of the bytecode instrumentation facility is completed and the injection of code fragments may begin.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
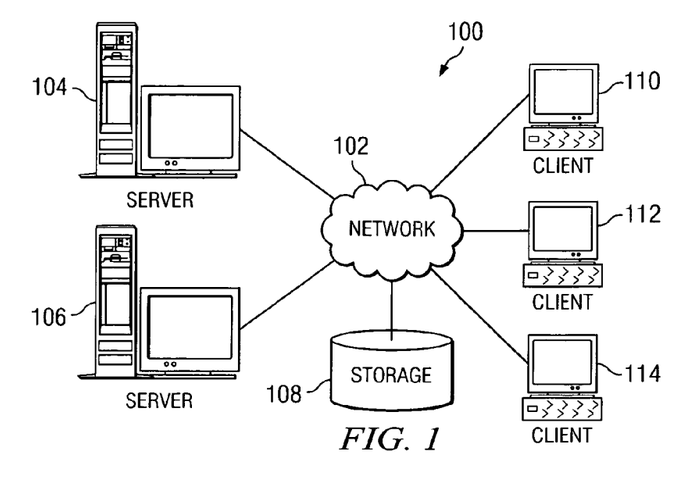
FIG. 1 depicts a pictorial representation of a distributed data processing system in which aspects of the present invention may be implemented.
Figure 2:
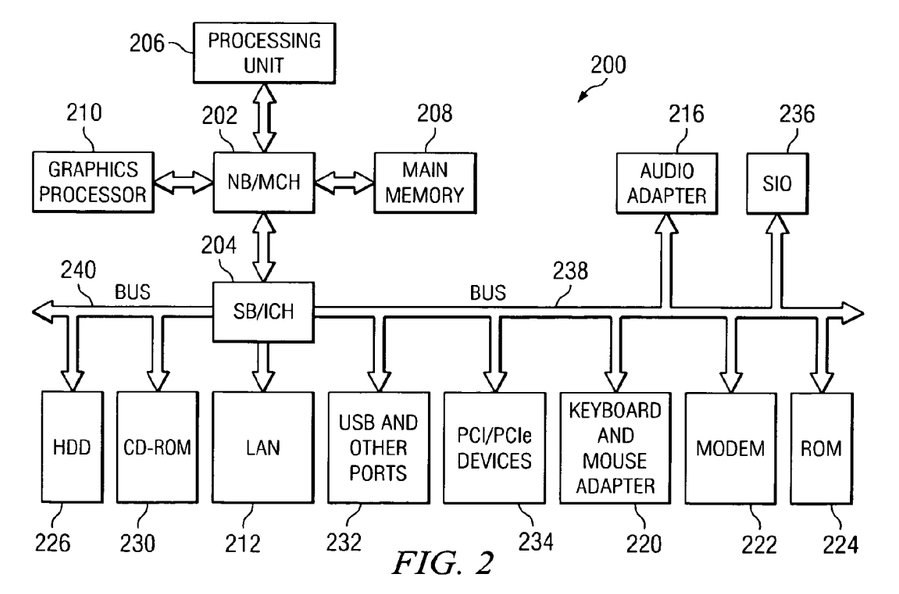
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIM) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the present invention provide a mechanism for improving the security of bytecode instrumentation facilities that modify application code segments. The mechanism of the present invention overcomes the issues with existing bytecode instrumentation facilities which rely only on file system security. With the mechanism of the present invention, the instrumentation facility may be rearchitected to operate in a more secure manner, such as by rewriting some of the internal components of the bytecode instrumentation facility (e.g., implementing the registry with encrypted storage rather than with an easily editable XML file). This increased security makes it much harder for a malicious user to exploit the facility, even in the case where the malicious user has access to the file system of an attacked machine.

Figure 3:
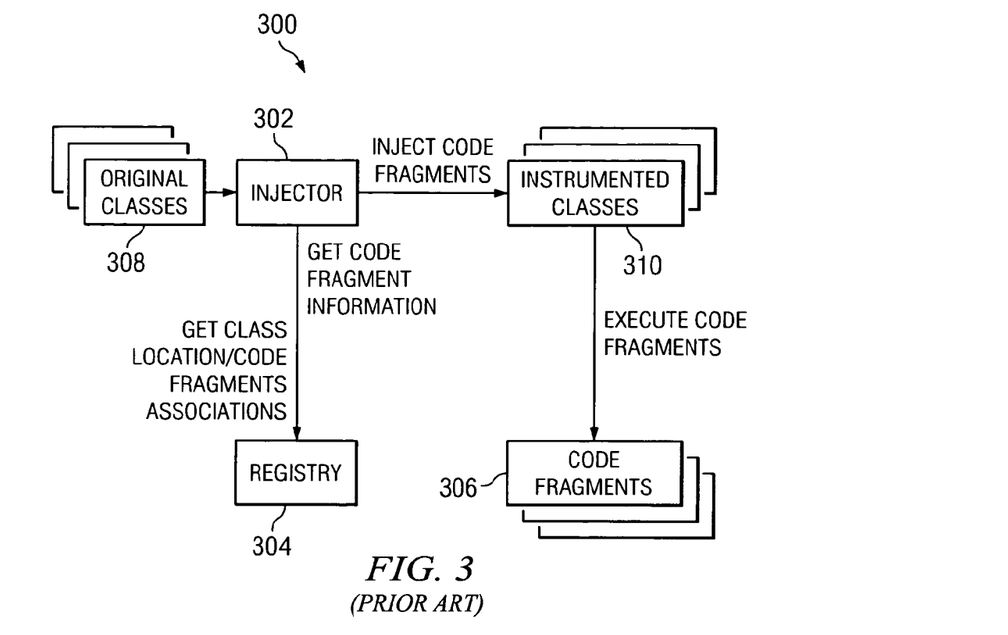
FIG. 3 is an example of a known bytecode insertion facility.
Figure 4:
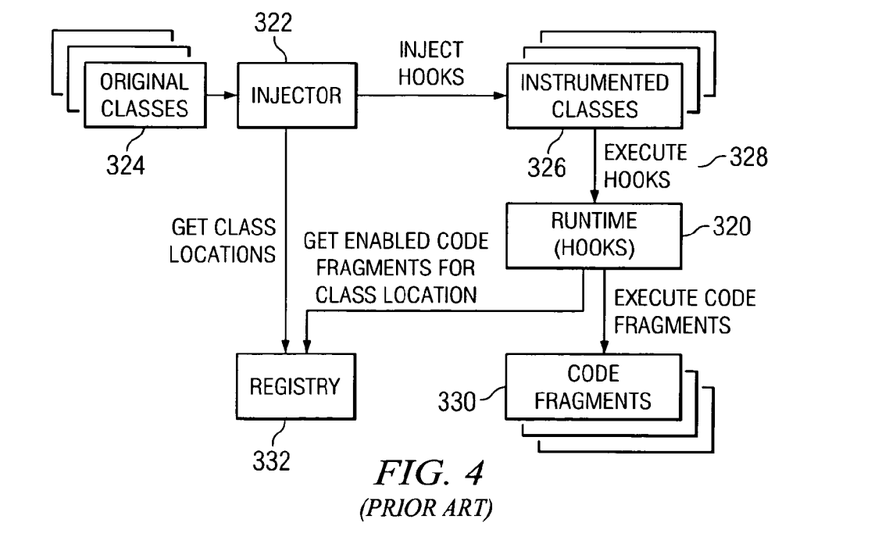
FIG. 4 is an example of a known bytecode insertion facility for just-in-time instrumentation.

FIGS. 3 and 4 are examples of known bytecode insertion facilities. A typical bytecode instrumentation facility 300 comprises three primary components: an injector 302, a registry 304, and code fragments 306. In the example in FIG. 3, injector 302 intercepts original classes 308. Injector 302 transforms the original classes into instrumented classes 310 by injecting code fragments 306 into the class files. Registry 304 maintains the associations between class locations, which are the entry/exit points of class methods and constructors, and the code fragments to inject in those locations. Code fragments 306 in instrumented classes 310 may then be executed at runtime.

The example in FIG. 4 depicts a known bytecode insertion facility using just-in-time instrumentation. More powerful auto-instrumentation systems like JITI and NETI allow enabling/disabling code fragments on the fly through the addition of a fourth bytecode instrumentation component, runtime 320. In this example, injector 322 transforms original classes 324 into instrumented classes 326 by injecting special byte-codes, or hooks 328, into the class files. Hooks 328 comprise the logic to manage the execution of the code fragments. When a hook in hooks 328 is executed, the hook obtains the list of code fragments 330 currently enabled for the hook's location from registry 332. The hook then executes the code fragments. Like registry 304 in the bytecode facility in FIG. 3, registry 332 maintains the associations between class locations and the code fragments to run in those locations.

A malicious user may take advantage of the existing bytecode instrumentation facilities presented above in various ways. For example, the malicious user may replace an original code fragment (one, for example, that logs statistic information about the location where the fragment is injected), with code designed to crash the application or to send confidential information to a remote site. This malicious action requires access to the file system to store the new code fragment. It does not require access to the registry. In another example, a malicious user may also change an existing association between a certain class location (e.g., a method meant to receive credit card information) and a code fragment (e.g., a code fragment that measures the time required to receive the information) with another existing code fragment that dumps the information on a file. This malicious action requires only access to the registry. In a third example, a malicious user may add malicious new code fragment to a new application location (where, for example, credit card information is available). This malicious action requires both access to the file system to store the new code fragment and access to the registry.

In a non-secure bytecode instrumentation facility, code fragments are installed simply by storing their files in the file system. The delicate process of registering/unregistering a code fragment and linking/unlinking a code fragment to one or more application code locations is performed by simply editing a text file.

In a secure bytecode instrumentation facility of the present invention, code fragments are digitally signed to allow the instrumentation facility to verify the origin (i.e., the identity of the code signer or publisher) of the code fragments and whether or not the code fragments have been altered since the code was signed. Any infrastructure for digital signatures may be used to implement the verification process of the present invention. The only requirement is to employ a digital signature to allow the instrumentation facility to verify the origin and the authenticity of the code fragments being registered.

Figure 5:
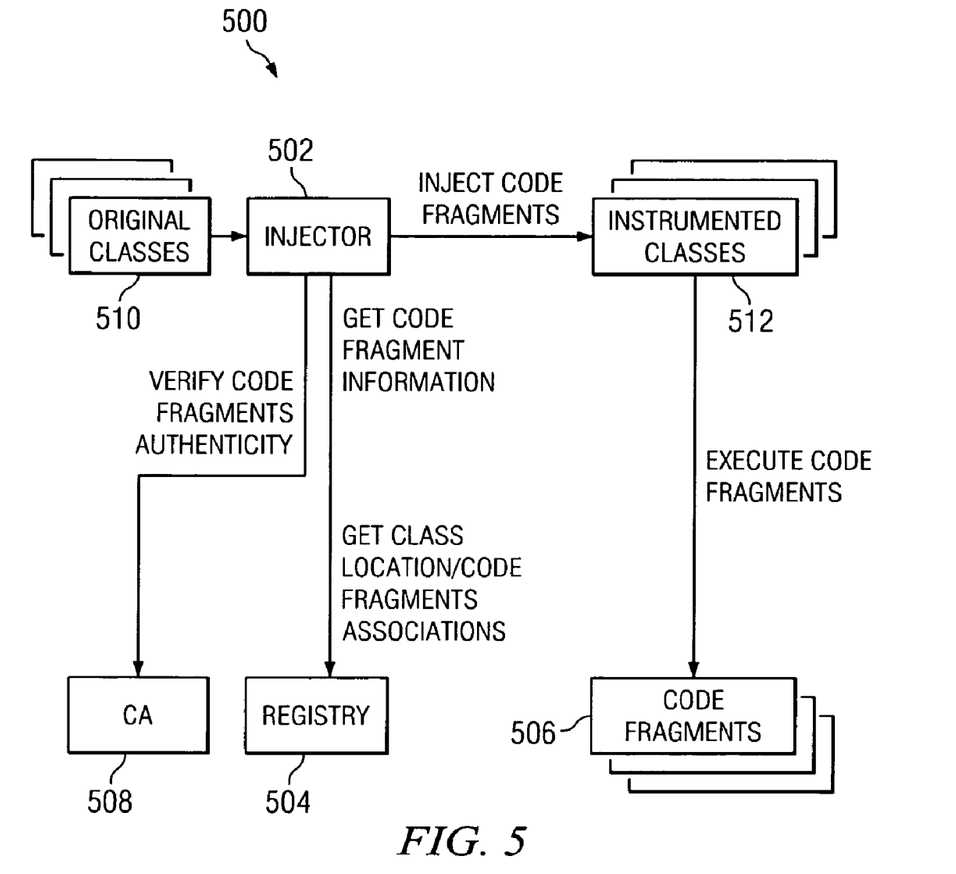
FIG. 5 is an exemplary secure bytecode instrumentation facility in accordance with an illustrative embodiment of the present invention.

FIG. 5 is an exemplary secure bytecode instrumentation facility in accordance with an illustrative embodiment of the present invention. Bytecode instrumentation facility 500 may be implemented to protect both the content of the code fragments and the information in the registry from malicious activities.

Bytecode instrumentation facility 500 comprises injector 502, a registry 504, code fragments 506, and certification authority (CA) 508. Injector 502 intercepts and transforms original classes 510 into instrumented classes 512 by injecting code fragments 306 into the class files. When a code fragment is registered, certification authority 508 is used to authenticate the origin of the code fragment.

Registry 504 maintains the associations between class locations, which are the entry/exit points of class methods and constructors, and the code fragments to inject in those locations. Registry 504 is not a text file but it is based on an encrypted and password protected storage, such as, for example, encrypted database tables. The delicate process of storing information in registry 504 is managed via password protected commands. Information within registry 504 may include a list of registered code fragment information, a list of associations between code fragments and class locations, a list of trusted code fragment origins used to verify that a code fragment being registered originated from a trusted source, and a list of trusted certification authorities used to verify that the certificate has been signed from a trusted certification authority.

Figure 6:
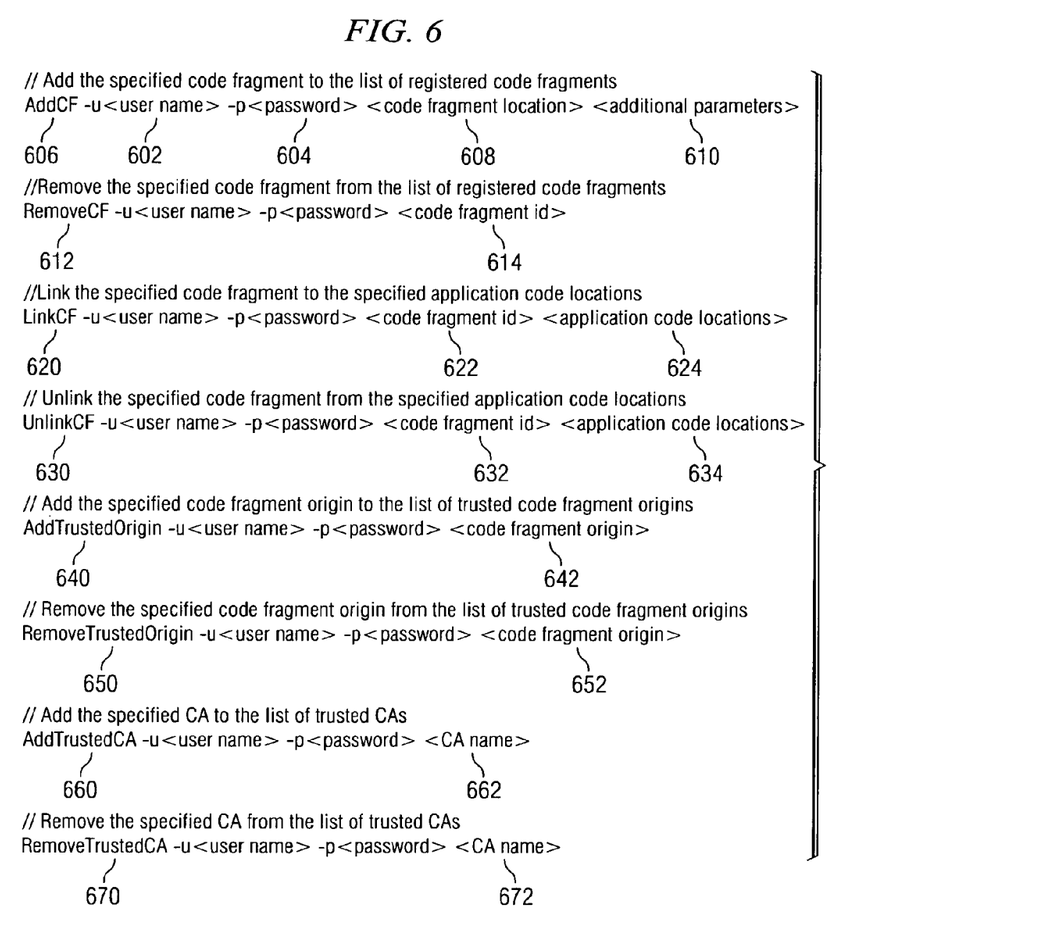
FIG. 6 depicts example password protected commands used to manage the registry in accordance with an illustrative embodiment of the present invention.

FIG. 6 depicts example password protected commands used to manage the registry in accordance with an illustrative embodiment of the present invention. Each command below includes password protection in the form of a user name field 602 and a password field 604.

The command to add code fragments (AddCF 606) adds the specified code fragment to the list of registered code fragments in the registry. AddCF 606 command specifies the location 608 of the code fragment, and any additional parameters 610 for the code fragment. The code fragment location includes a digital certificate used when the command is executed to verify that the identity of the code signer is in a list of trusted certification authorities in the registry, such as registry 504 in FIG. 5. RemoveCF 612 command, which specifies a code fragment ID 614 for identifying the code fragment, removes the specified code fragment from the list of registered code fragments. LinkCF 620, which specifies a code fragment ID 622 and locations 624 of the application code, links the specified code fragment to the specified application code locations specified in the application code. UnlinkCF 630 unlinks the specified code fragment (code fragment ID 632) from the specified application code locations 634. AddTrustedOrigin 640 command, which specifies the origin 642 of the registered code fragment, adds the specified code fragment origin to the list of trusted code fragment origins used to verify that a code fragment being registered comes from a trusted origin. RemoveTrustedOrigin 650 command removes the specified code fragment origin 652 from the list of trusted code fragment origins. AddTrustedCA 660 command specifies a name of the certification authority (CA name 662) and adds the specified certification authority to the list of trusted certification authorities. RemoveTrustedCA 670 removes the specified certification authorities (CA Name 672) from the list of trusted certification authorities.

Because the process of validating the code fragments can be very lengthy, the validation process is not performed when the facility is initialized. Rather, the validation is performed when a new code fragment is registered. Once validated, the relevant information of the code fragment, such as origin, location, file dates/times, checksum, etc., are recorded in the encrypted registry.

Each time the bytecode instrumentation facility registers a new code fragment, the bytecode instrumentation verifies that the certification authority that authenticated the origin of the code fragment is in the list of trusted certification authorities in the registry, that the origin of the code fragment is in the list of trusted code fragment origins, and that the content of the code fragment is authentic.

Figure 7:
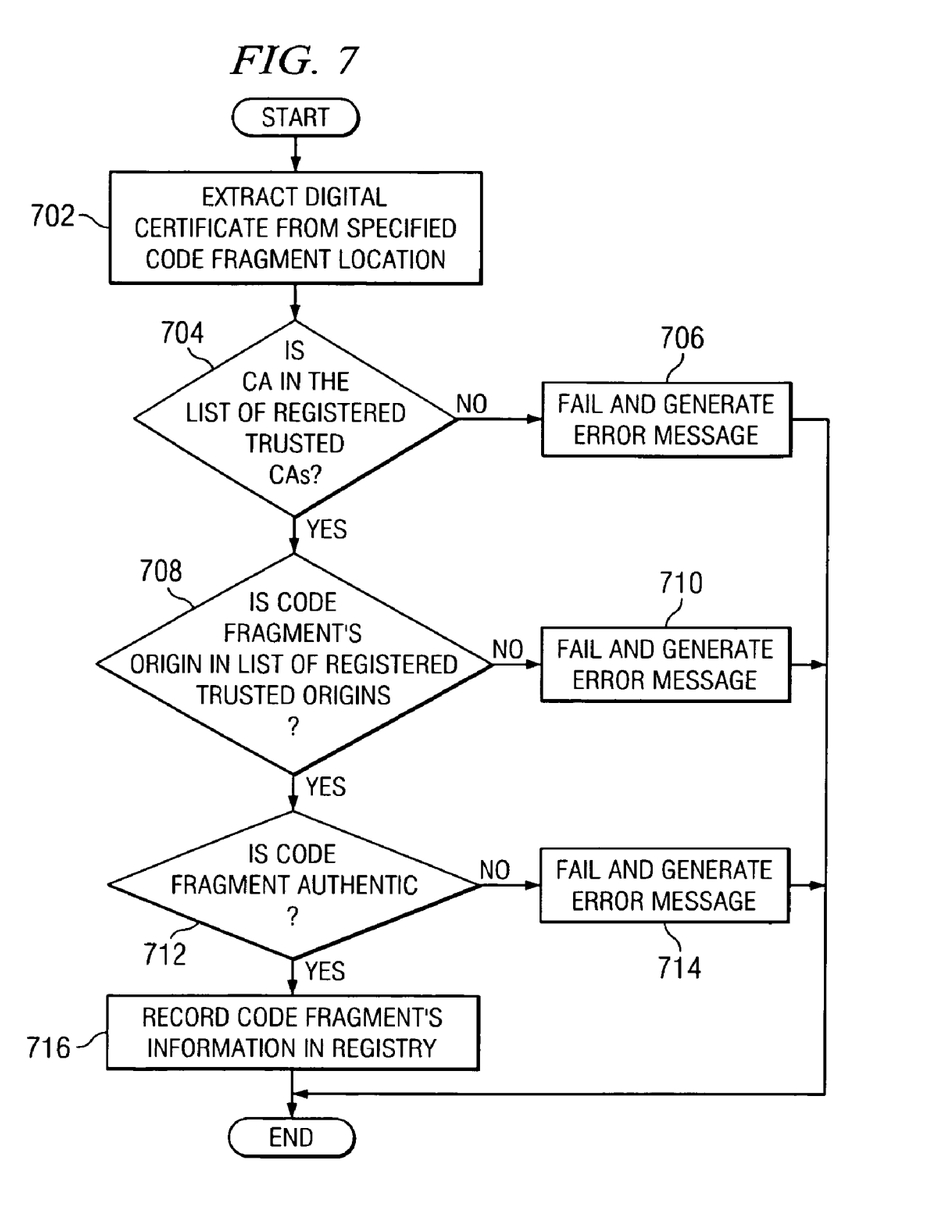
FIG. 7 is a flowchart of a process for registering a new code fragment in accordance with an illustrative embodiment of the present invention.

FIG. 7 is a flowchart of a process for registering a new code fragment in accordance with an illustrative embodiment of the present invention. In particular, the process described in FIG. 7 illustrates exemplary steps executed by an add code fragment (AddCF) command to register a new code fragment.

The process begins with the AddCF command extracting the digital certificate from the code fragment location specified in the command (step 702). The AddCF command then uses the extracted digital certificate to determine whether the certification authority that supplied the new code fragment is a trusted certification authority (step 704). The AddCF command may verify that the certification authority is a trusted certification authority by comparing the extracted digital signature against a list of registered trusted certification authorities in the registry, such as registry 504 in FIG. 5. If the certification authority of the extracted digital signature is not in the list registered trusted certification authorities, the AddCF command fails and generates an error message (step 706), such as, for example, "Code fragment: <fragment name> CA: <CA name> not trusted. Instrumentation facility is unable to start".

If the certification authority of the extracted digital signature is in the list registered trusted certification authorities, a determination is made as to whether the origin of the code fragment (i.e., the identity of the code signer or publisher) is trusted (step 708). The AddCF command may verify that the origin of the code fragment is a trusted origin by comparing the extracted digital signature against a list of registered trusted origins in the registry, such as registry 504 in FIG. 5. If the origin of the code fragment is not in the list of registered trusted origins, the AddCF command fails and generates an error message (step 710), such as, for example, "Code fragment: <fragment name> of origin: <fragment origin> not trusted. Instrumentation facility is unable to start."

The AddCF command then makes a determination as to whether the code fragment is authentic (step 712). This determination may include determining if the size of the code fragment or the checksum of the code fragment differs from the size or the checksum information for the code fragment in the extracted digital signature. If the code fragment is not authentic, the AddCF command fails and generates an error message (step 714), such as, for example, "Code fragment: <fragment name> is corrupted. Instrumentation facility is unable to start."

If the code fragment is determined to be authentic, the AddCF command records the code fragment's information, such as the code fragment's origin, locations, file dates/times, file size, file checksum, etc. in the registry (step 716).

Figure 8:
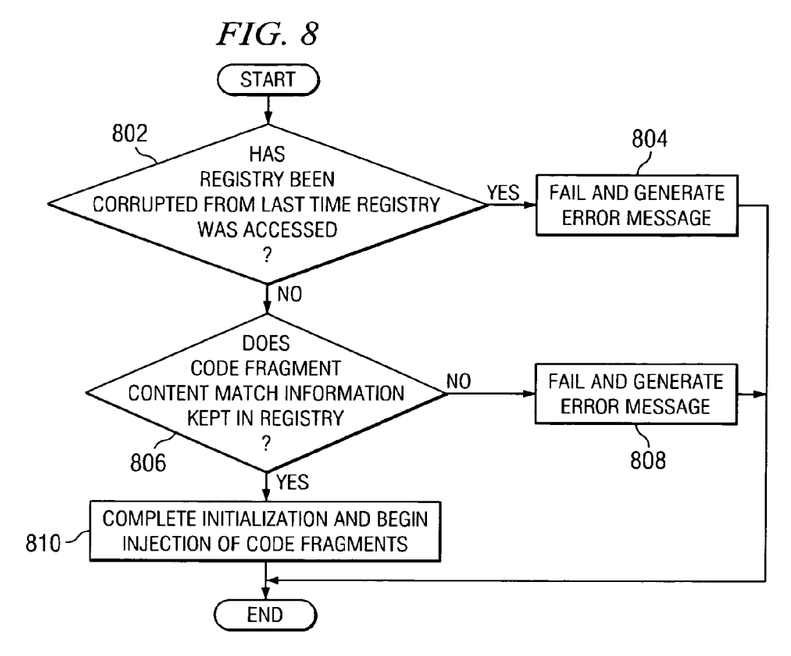
FIG. 8 is a flowchart of a process of steps executed by the injector at initialization time in accordance with an illustrative embodiment of the present invention.

FIG. 8 is a flowchart of a process of steps executed by the injector at initialization time in accordance with an illustrative embodiment of the present invention. The process described in FIG. 8 is performed when the bytecode instrumentation facility initializes.

The process begins at initialization time with the injector determining whether the registry has been corrupted from the last time the registry was accessed (step 802). To perform this verification, the injector in the instrumentation facility may read from the registry the information of any registered code fragment and verifies that the code fragment has not been modified. This modification verification may be performed by checking for modifications to code fragment information (file dates/times, file size, file checksum, etc.) previously stored by the AddCF command described in FIG. 7. If the injector determines that the registry is corrupted, the bytecode injection initialization process fails and generates an error message (step 804), such as, for example, "Registry corrupted. Instrumentation facility is unable to start."

If the injector determines that the registry is not corrupted, the injector then verifies that the content of each code fragment in the list of registered code fragments matches its corresponding code fragment information kept in the registry (step 806). If the content of the code fragment does not match its code fragment information in the registry, the code fragment content is deemed to be corrupted, and the bytecode injection initialization process fails and generates an error message (step 808), such as, for example, "Code fragment: <fragment name> is corrupted. Instrumentation facility is unable to start."

If the content of the code fragments match the code fragment information in the registry, the bytecode injection initialization is completed, and the facility may begin to inject the code fragments into the classes (step 810).

Figure 9:
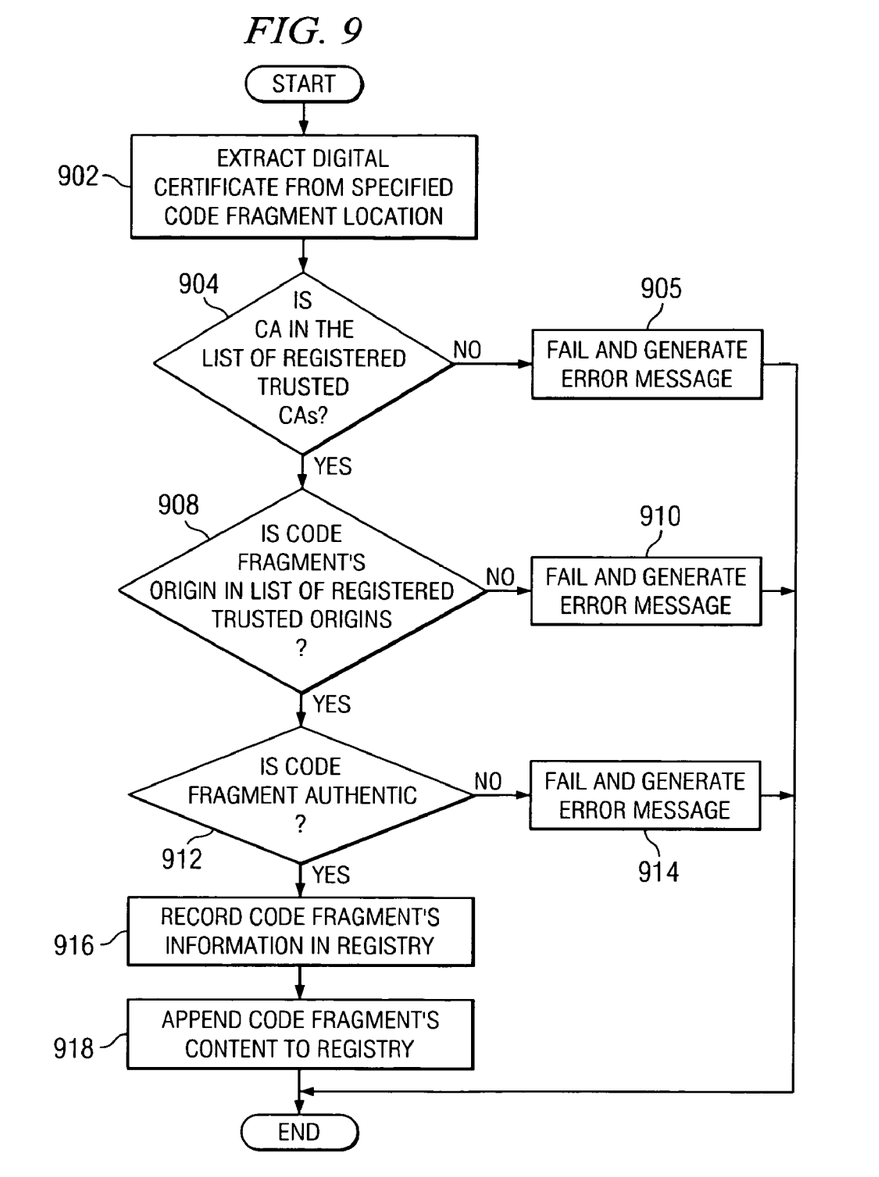
FIG. 9 is a flowchart of a process for registering a new code fragment in accordance with an alternative illustrative embodiment of the present invention.

FIG. 9 is a flowchart of a process for registering a new code fragment in accordance with an alternative illustrative embodiment of the present invention. The process described in FIG. 9 illustrates alternative steps that may be executed by an add code fragment (AddCF) command to register a new code fragment. This process appends the content of the code fragments, which a typically not large in size, to the encrypted registry as the final step of the AddCF command. By appending the code fragments' content to the encrypted registry in this manner, the bytecode instrumentation facility does not need to verify that the contents of the code fragments have not been tampered with when the system initializes.

The process steps 902 through 916 in this embodiment of the present invention which are executed by the AddCF command comprise the same steps as described in steps 702 through 716 in FIG. 7. However, in this particular embodiment, once the code fragment is determined to be authentic and the AddCF command records the code fragment's information, such as the code fragment's origin, locations, file dates/times, file size, file checksum, etc. in the registry (step 916), the AddCF command performs an addition step by appending the contents of the code fragments to the registry (step 918). As the registry is an encrypted and password protected storage, at initialization time, the instrumentation facility does not need to verify that the code fragments have not been corrupted by a malicious user.

Thus, in addition to containing a list of registered code fragment information, a list of associations between code fragments and class locations, a list of trusted code fragment origins used to verify that a code fragment being registered originated from a trusted source, and a list of trusted certification authorities used to verify that the certificate has been signed from a trusted certification authority, the registry in this particular embodiment of the present invention will also contain the content of the code fragments.

Figure 10:
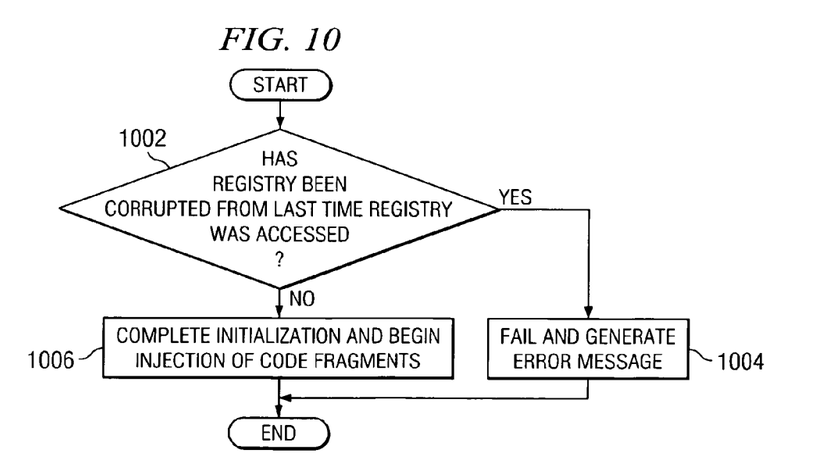
FIG. 10 is a flowchart of a process illustrating alternative steps executed by the injector at initialization time in accordance with an illustrative embodiment of the present invention.

FIG. 10 is a flowchart of a process illustrating the steps executed by the injector at initialization time in accordance with an illustrative embodiment of the present invention. The process described in FIG. 10 may be performed by the injector when the code fragments are registered using the AddCF command described in FIG. 9.

The process begins at initialization time with the injector verifying that the registry has not been corrupted from the last time the registry was accessed (step 1002). For instance, the injector may read from the registry the information of any registered code fragment and verifies that the code fragment has not been modified. This modification verification may be performed by checking for modifications to code fragment information (file dates/times, file size, file checksum, etc.) previously stored by the AddCF command described in FIG. 9. If the injector determines that the registry is corrupted, the bytecode injection initialization process fails and generates an error message (step 1004), such as, for example, "Registry corrupted. Instrumentation facility is unable to start."

If the injector determines that the registry is not corrupted, the bytecode injection initialization is completed, and the facility may begin to inject the code fragments into the classes (step 1006).

Figure 11:
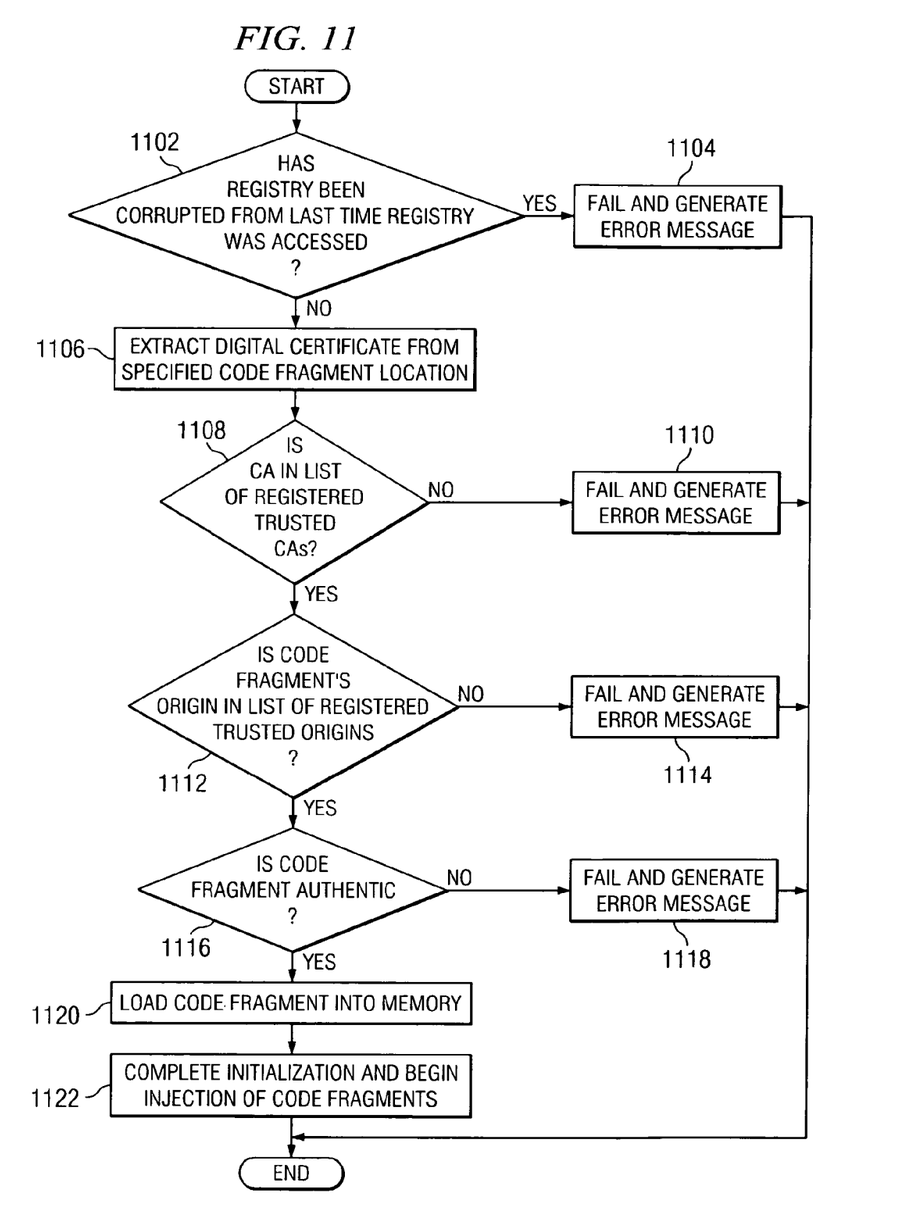
FIG. 11 is a flowchart of a process illustrating alternative steps executed by the injector at initialization time in accordance with an illustrative embodiment of the present invention.

FIG. 11 is a flowchart of a process illustrating alternative steps executed by the injector at initialization time in accordance with an illustrative embodiment of the present invention. This alternative process may be performed by the injector when verifying the authenticity of code fragments only at registration time, such as in the code fragment registration processes described in FIGS. 7 and 9, is not considered secure enough. Problems may arise due to performing verification of the authenticity of the code fragments only during the registration process, since certification authorities may revoke issued certificates. In contrast with other embodiments of the present invention, the injector in this case executes the steps executed by the AddCF command anytime the instrumentation facility initializes, and/or optionally, at configured interval times (e.g., every hour).

The process begins at initialization time with the injector verifying that the registry has not been corrupted from the last time the registry was accessed (step 1102). If the injector determines that the registry is corrupted, the bytecode injection initialization process fails and generates an error message (step 1104), such as, for example, "Registry corrupted. Instrumentation facility is unable to start."

Next, for each code fragment record in the list of registered code fragments in the registry, the injector extracts the digital certificate from the code fragment location specified in the command (step 1106). The injector then uses the extracted digital certificate to determine whether the certification authority that supplied the new code fragment is a trusted certification authority (step 1108), such as by comparing the extracted digital signature against a list of registered trusted certification authorities in the registry. If the certification authority of the extracted digital signature is not in the list registered trusted certification authorities, the process fails and an error message is generated (step 1110), such as, for example, "Code fragment: <fragment name> CA: <CA name> not trusted. Instrumentation facility is unable to start".

If the certification authority of the extracted digital signature is in the list of registered trusted certification authorities, a determination is made as to whether the origin of the code fragment (i.e., the identity of the code signer or publisher) is trusted (step 1112), such as by comparing the extracted digital signature against a list of registered trusted origins in the registry. If the origin of the code fragment is not in the list of registered trusted origins, the process fails and an error message is generated (step 1114), such as, for example, "Code fragment: <fragment name> of origin: <fragment origin> not trusted. Instrumentation facility is unable to start."

If the origin of the code fragment is in the list of registered trusted origins, a determination is made as to whether the code fragment is authentic (step 1116). If the code fragment is not authentic, the process fails and an error message is generated (step 1118), such as, for example, "Code fragment: <fragment name> is corrupted. Instrumentation facility is unable to start."

If the code fragment is authentic, the injector loads the code fragment in memory (step 1120), so that the code fragment cannot be accessed while the instrumentation facility is executing. At this point, the bytecode injection initialization is completed, and the facility may begin to inject the code fragments into the classes (step 1122).

It should be noted that in the embodiments provided above, the injector is stopped when the first corrupted code fragment is found. The entire injection process may be stopped rather than just removing the guilty code fragment because often code fragments depend one on the others and removing one of them from the application could lead to instability or crashes.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system is suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for registering a new code fragment in an encrypted registry of a bytecode instrumentation facility, the computer implemented method comprising:
    verifying a certification authority that authenticated an origin of the new code fragment is a trusted certification authority;
    verifying the origin of the new code fragment is a trusted code fragment origin; verifying a content of the new code fragment is authentic; and
    recording information of the new code fragment into the encrypted registry, wherein security of the bytecode instrumentation facility is increased;
wherein verifying a certification authority that authenticated an origin of the new code fragment is a trusted certification authority further comprises:
extracting a digital certificate from a specified code fragment location to form an extracted digital certificate;
using the extracted digital certificate to determine that a certification authority in the extracted digital certificate is a registered trusted certification authority by comparing an extracted digital signature of the extracted digital certificate against a list of registered trusted certification authorities in the encrypted registry.

2. The computer implemented method of claim 1, further comprising:
    initializing the bytecode instrumentation facility, wherein the initializing includes:
        determining that the encrypted registry has not been corrupted since a last time the encrypted registry was accessed;
        responsive to a determination that the encrypted registry has not been corrupted, determining that the content of the new code fragment matches information of the new code fragment in the encrypted registry; and
        responsive to a determination that the content of the new code fragment matches the information of the new code fragment in the encrypted registry, completing initialization of the bytecode instrumentation facility and beginning injection of code fragments into class files to form instrumented class files.

3. The computer implemented method of claim 1, further comprising:
    appending content of the new code fragment to the encrypted registry.

4. The computer implemented method of claim 3, further comprising:
    initializing the bytecode instrumentation facility, wherein the initializing includes:
        determining that the encrypted registry has not been corrupted since a last time the encrypted registry was accessed; and
        responsive to a determination that the encrypted registry has not been corrupted, completing initialization of the bytecode instrumentation facility and beginning injection of code fragments.

5. The computer implemented method of claim 1, wherein information recorded in encrypted registry is managed via password protected commands.

6. The computer implemented method of claim 1, wherein the encrypted registry comprises a list of registered code fragment information, a list of associations between code fragment locations and class locations, a list of trusted code fragment origins used to verify that a code fragment being registered originated from a trusted source, and a list of trusted certification authorities used to verify that the certificate has been signed from a trusted certification authority, wherein the code fragment locations include digital certificates used in determining whether an identity of a code signer is in a list of registered trusted certification authorities in the encrypted registry.

7. The computer implemented method of claim 1, wherein the information of the new code fragment recorded in the encrypted registry includes at least one of origin, location, file dates/times, file size, or file checksum data.

8. The computer implemented method of claim 1, wherein the origin of the new code fragment comprises an identity of at least one of a code signer or publisher.

9. The computer implemented method of claim 1, wherein verifying the origin of the new code fragment is a trusted code fragment origin comprises:
    extracting a digital certificate from a specified code fragment location to form an extracted digital certificate;
    determining that an origin of the new code fragment is a registered trusted origin by comparing an extracted digital signature of the extracted digital certificate against a list of registered trusted origins in the encrypted registry.

10. The computer implemented method of claim 1, wherein verifying a content of the new code fragment is authentic comprises:
    determining that one of a size or checksum of the new code fragment differs from a size or checksum information for the new code fragment in an extracted digital signature.

11. A computer implemented method for initializing a bytecode instrumentation facility, the computer implemented method comprising:
    determining that an encrypted registry has not been corrupted since a last time the encrypted registry was accessed;
    responsive to a determination that the encrypted registry has not been corrupted, verifying a certification authority that authenticated an origin of a new code fragment is a trusted certification authority;

verifying the origin of the new code fragment is a trusted code fragment origin; verifying a content of the new code fragment is authentic;

loading the new code fragment in memory to prevent the new code fragment from being accessed while the bytecode instrumentation facility is executing;

completing initialization of the bytecode instrumentation facility and beginning injection of code fragments into class files to form instrumented class files, wherein security of the bytecode instrumentation facility is increased;

wherein verifying a certification authority that authenticated an origin of the new code fragment is a trusted certification authority further comprises:

extracting a digital certificate from a specified code fragment location to form an extracted digital certificate;

using the extracted digital certificate to determine that a certification authority in the extracted digital certificate is a registered trusted certification authority by comparing an extracted digital signature of the extracted digital certificate against a list of registered trusted certification authorities in the encrypted registry.

12. A computer program product for registering a new code fragment in an encrypted registry of a bytecode instrumentation facility, the computer program product comprising:
a computer usable memory element having computer executable program code stored thereon, the computer executable program code comprising:
computer executable program code for verifying a certification authority that authenticated an origin of a new code fragment is a trusted certification authority;
computer executable program code for verifying the origin of the new code fragment is a trusted code fragment origin;
computer executable program code for verifying a content of the new code fragment is authentic; and
computer executable program code for recording information of the new code fragment into the encrypted registry, wherein security of the bytecode instrumentation facility is increased;
wherein the computer executable program code for verifying a certification authority that authenticated an origin of a new code fragment is a trusted certification authority further comprises:
computer executable program code for extracting a digital certificate from a specified code fragment location to form an extracted digital certificate; and
computer executable program code for comparing an extracted digital signature of the extracted digital certificate against a list of registered trusted certification authorities in the encrypted registry.

13. The computer program product of claim 12, further comprising computer executable program code for initializing the bytecode instrumentation facility, wherein the computer executable program code for initializing the bytecode instrumentation facility includes:
computer executable program code for determining that the encrypted registry has not been corrupted since a last time the encrypted registry was accessed;
computer executable program code responsive to a determination that the encrypted registry has not been corrupted for determining that the content of the new code fragment matches information of the new code fragment in the encrypted registry; and
computer executable program code responsive to a determination that the encrypted registry has not been corrupted for completing initialization of the bytecode instrumentation facility and beginning injection of code fragments into class files to form instrumented class files.

14. The computer program product of claim 12, further comprising computer executable program code for appending content of the new code fragment to the encrypted registry.

15. The computer program product of claim 14, further comprising computer usable program code for initializing the bytecode instrumentation facility, wherein the computer usable program code for initializing the bytecode instrumentation facility include:
computer executable program code for determining that the encrypted registry has not been corrupted since a last time the encrypted registry was accessed; and
computer executable program code responsive to a determination that the encrypted registry has not been corrupted for completing initialization of the bytecode instrumentation facility and beginning injection of code fragments if the encrypted registry has not been corrupted.

16. The computer program product of claim 12, wherein information recorded in the encrypted registry is managed via password protected commands.

17. The computer program product of claim 12, wherein the encrypted registry comprises a list of registered code fragment information, a list of associations between code fragment locations and class locations, a list of trusted code fragment origins used to verify that a code fragment being registered originated from a trusted source, and a list of trusted certification authorities used to verify that the certificate has been signed from a trusted certification authority, wherein the code fragment locations include digital certificates used in determining whether an identity of a code signer is in a list of registered trusted certification authorities in the encrypted registry.

18. The computer program product of claim 12, wherein the information of the new code fragment recorded in the encrypted registry includes at least one of origin, location, file dates/times, file size, or file checksum data.

* * * * *